Patented Jan. 1, 1929.

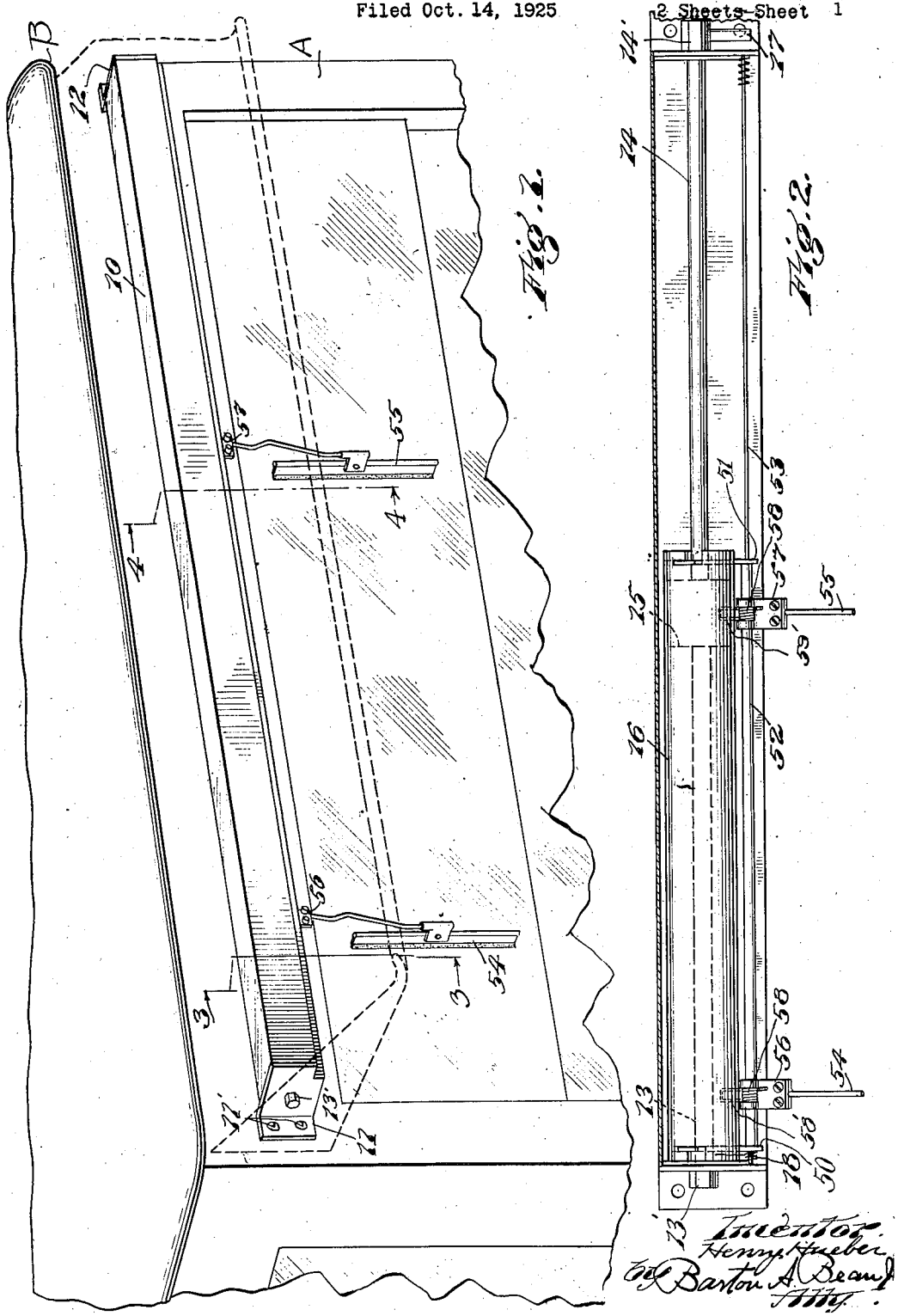

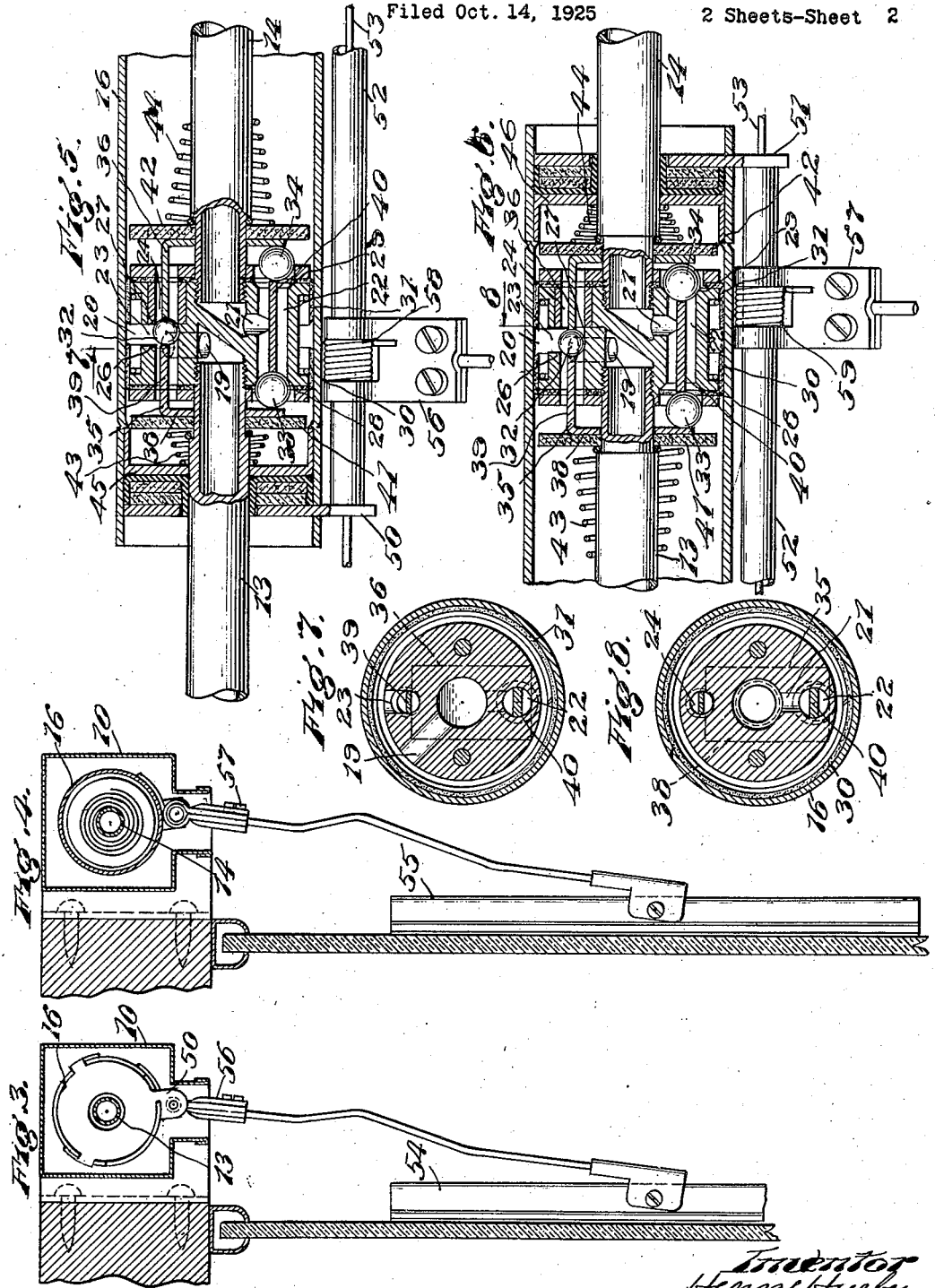

1,697,358

UNITED STATES PATENT OFFICE.

HENRY HUEBER, OF BUFFALO, NEW YORK, ASSIGNOR TO TRICO PRODUCTS CORPORATION, OF BUFFALO, NEW YORK.

AUTOMATIC WINDSHIELD CLEANER.

Application filed October 14, 1925. Serial No. 62,435.

This invention relates to windshield cleaners or wipers for automobiles, street cars and the like.

The objects of the present invention are to provide a windshield cleaner which will effectively clean all or a large portion of a selected section of the windshield glass; also to provide a windshield cleaner which while cleaning a relatively great area of the windshield glass is simple in design and consists of relatively few parts and may be readily positioned and maintained on the windshield of an automobile or the like without getting out of order or becoming distorted; also to provide a windshield cleaner adapted to clean a large area of the windshield glass, which is neat and attractive in appearance and does not detract from the appearance of the automobile or vehicle upon which it is placed.

In the accompanying drawings:

Fig. 1 is an elevation of a portion of an automobile windshield showing the device of the invention in position thereon.

Fig. 2 is a sectional elevation lengthwise of the device embodying the invention.

Fig. 3 is a section thereof on line 3—3, Fig. 1, but on an enlarged scale.

Fig. 4 is a section on line 4—4, Fig. 1, but on an enlarged scale.

Fig. 5 is a sectional elevation showing the piston and valve construction.

Fig. 6 is a view similar to Fig. 5 but showing the valves in different position.

Fig. 7 is a section on line 7—7, Fig. 5.

Fig. 8 is a section on line 8—8, Fig. 6.

A designates a portion of an automobile windshield and B designates a portion of the roof of the vehicle.

In accordance with the present invention there is provided a housing which is adapted to be secured to the windshield frame or to the car or vehicle adjacent the windshield glass. This housing is preferably constructed of sheet metal or other suitable material and constructed so as to be substantially rigid and is preferably provided with parts for attachment to the windshield frame or to the vehicle.

In the form of the invention shown, 10 designates a housing which may be of any suitable size or shape, as for example the rectangular metal tube shown, which is adapted to house the operating parts of the cleaner and is formed in its underside with a lengthwise flanged slot or guideway. The housing shown is provided with substantially rigid end plates or members 11 and 12 adapted to be secured to the vehicle as by screws 11'. 13 and 14 respectively designate air admission and air exhaust pipes or conduits. These air admission and air exhaust pipes or conduits are preferably formed of relatively rigid tubing or material, the outer ends of these members being secured in the end pieces or plates of the housing by nuts 13' and 14' and the inner ends are preferably secured in the stationary abutment or piston 15. These air inlet and exhaust members also preferably serve as supporting and guiding means for the cylinder or movable part 16 of the cleaner motor. This cylinder may be of any suitable size or form, such for example, as shown in detail in concurrently filed application Serial No. 62,437. The air exhaust pipe 14 is provided with a suitable part, such for example as the nipple 17, whereby the pipe may be connected to a source of lowered pressure, so that air will be exhausted from the cleaner motor through this pipe. In use on an automobile, the air exhaust pipe is usually connected to a conduit or tube leading to the intake manifold of the vehicle engine or to the suction line between the automobile engine and its fuel tank or fuel supply. The air admission pipe 13 is provided with a suitable opening to the atmosphere, in the form shown this atmospheric opening being indicated at 18 and being within the confines of the housing. The stationary abutment or piston member preferably carries the automatic valves for reversing the application of the air exhausting influence and the admission of air to the cylinder. For this purpose the air admission tube 13 communicates by means of a port 19 with a chamber 20 in the piston and the air exhaust tube 14 communicates through a port 21 with a passage 22 in the piston. The chamber 20 has a hole or port 23 which communicates with a passage 24 which is in communication with opposite ends of the cylinder. This passage 24 is provided with a pair of valve seats 26 and 27 and is controlled by a valve to be hereinafter described. The passage 22 is adapted to communicate with the opposite ends of the cylinder and is provided with valve seats 28 and 29 controlled by valves to be hereinafter described. The piston is preferably provided with cupped leather packings as indicated at 30 and 31 for the purpose of preventing leakage past the piston.

The piston thus generally described and the valves may be of any suitable construction, the form shown being that described in detail and claimed in concurrently filed application, Serial No. 62,437. In such form, 32 designates a ball valve for contacting with the valve seats 26 and 27, this ball valve being capable of movement from one valve seat to the other. As illustrated in Fig. 5, the ball valve is in contact with the valve seat 27, thereby closing communication between the chamber 20 which receives atmospheric air and the right hand side of the cylinder, the atmospheric air being applied past the valve seat 26 which is open to the left hand side of the cylinder. In the illustration in Fig. 6, the ball valve 32 is in contact with the seat 26, thereby putting the right hand side of the cylinder in communication with the atmosphere and closing the left hand side of the cylinder to the atmosphere. The exhausting of air from the sides of the cylinder is controlled by the ball valves 33 and 34 which cooperate with the seats 28 and 29 of passage 22. In the illustration in Fig. 5 the ball 33 is on its seat 28 thereby closing the left hand side of the cylinder to the air exhausting influence and the air is being exhausted from the right hand side of the cylinder past the ball valve which is off of its seat. The reverse is the situation with regard to Fig. 6 where the valve 33 is off of its seat. Consequently air is being exhausted from the left hand side of the cylinder through means of pipe 14, port 21 and passage 22. In the form shown, the valves are actuated by the following means:

35 and 36 designate a pair of plate members which are mounted for limited movement on the pipes 13 and 14. These plate members have body portions 38 and angular tongue or arm portions 39. The body portions 38 are disposed approximately parallel to the sides of the piston and the tongues or arms 39 extend into the passage 24 and the ends of these tongues or arms contact with the ball valve 32 at opposite sides thereof. The ends of the plate or body members 38 remote from the arms or tongues are adapted to contact with the ball valve 33 and 34 and cause movement of these ball valves by pressing against one or another of the valves, the one valve being moved by the other through the intermediary of a spacing member 40. This spacing member 40 is preferably of such size so as to lie loosely and move freely in the passage 22, whereupon movement of one of the ball valves toward its seat will cause the other ball valve to be removed from its seat. 41 and 42 designate washers or buffing strips of felt or other suitable material which are interposed between the body portions 38 of the plate members and the springs 43 and 44 respectively, through which pressure is transmitted from the ends of the cylinders to the valves to move them. As illustrated in Fig. 5 the end 45 of the cylinder 16 is pressing upon the spring 43. This has compressed the spring 43, moving the plate 35, thereby seating the valve 33 and removing the valve 34 from its seat. At the same time the valve 32 is forced to its seat 27 and in such position air exhausting influence is ready to be applied to the right hand of the cylinder and atmospheric air is admitted from the chamber 20 through the passage 23 past the valve seat 26 into the left hand side of the cylinder. This results in a movement of the cylinder towards the left from the position shown in Fig. 5 until, as shown in Fig. 6, the right hand end 46 of the cylinder contacts with the spring 44, which exerts its pressure upon the plate 36, resulting in seating the valve 34, in unseating the valve 33 and in placing the atmospheric ball valve upon its seat 26. In such position the air exhausting influence is applied through the port 21, passage 22, past valve seat 28, to the left hand end of the cylinder and atmospheric air is being admitted from chamber 20, past valve seat 27 to the right hand end of the cylinder. These operations continue intermittently as long as the conduit 14 is under the air exhausting influence, moving the cylinder back and forth upon the tubes 13 and 14 and moving the wiper strips back and forth upon the windshield glass.

In the form shown, a pair of wiper strips are secured to the cylinder by suitable means and means are provided for maintaining the wipers pressed resiliently against the windshield glass and for preventing rotation or turning of the cylinder on the piston rods.

In the form of the invention shown, the ends 45 and 46 of the cylinder are provided with projecting portions or arms 50 and 51. Between these arms is mounted a tube or sleeve 52 which is supported at its opposite ends by the respective arms and constitutes a sustaining spacer for said arms. Extending lengthwise through this sleeve 52 is a wire or rod 53, this wire or rod being connected to the ends of the housing, as shown in Fig. 2, and stretched tightly whereby a substantially rigid guide is provided for the guide sleeve 52. This permits the cylinder to move freely back and forth and at the same time provides a guiding means for preventing rotation or turning of the cylinder and a steadying support for the motor unit against sudden and violent jarring.

The wipers 54 and 55 are mounted on suitable carriages or carriers 56 and 57 preferably supported by the guide sleeve 52 and provided with springs 58 and 59 for resiliently urging the wipers toward the windshield glass. As illustated, one end of each of these springs bears upon the carriers 56 and 57 and the other ends 58' and 59' bear on the tube or cylinder, whereby the resilient contact with the glass is maintained. The cylinder is prevented from rotation or turning by means of the bearing of the guide tube 52, or the arms 50 and 51, upon the guide wire 53. The provision of a guide tube of approximately the length of the cylinder gives a relatively large bearing surface so that the wire or rod 53 will not be distorted or bent and as this rod or wire is under considerable tension there is relatively small friction between the guide tube and the wire on which it slides and the position of the wiper is not affected by any distortion or bending of the housing between the ends thereof as the guide wire is carried by the substantially heavy or rigid end pieces of the housing.

I claim as my invention:

1. In a windshield cleaner, a housing adapted to be secured on a windshield and having a slot formed in one wall, a fluid pressure operated cylinder mounted to reciprocate in said housing lengthwise of the slot, a wiper member connected to said cylinder through said housing slot, a guide sleeve carried by said cylinder, and a guide rod supported by and mounted in said housing between the housing slot and the cylinder and extending through said guide sleeve for maintaining said wiper member in contact with the windshield glass.

2. In a windshield wiper, a cylinder movable by fluid pressure, a support for said cylinder, end pieces on said cylinder, a guide rod mounted on said support, a sleeve supported by said end pieces and cooperating therewith and with the guide rod to maintain a connected wiper in contact with the windshield glass, and a wiper carried by said sleeve for movement therewith.

3. In a windshield wiper, a fluid pressure operated cylinder mounted to reciprocate adjacent a windshield glass, guide parts at the ends of said cylinder, said parts having apertures therein, a guide member extending through said apertures and secured substantially rigidly adjacent the windshield glass whereby said cylinder is held against turning, a spacing sleeve on said guide member between said parts, a wiper carrier on said spacing sleeve, a wiper carried by said wiper carrier, and an operative connection between said wiper carrier and said cylinder.

4. In a windshield cleaner, a fluid pressure operated cylinder adapted to reciprocate adjacent a windshield glass, laterally projecting parts on said cylinder having apertures therein, a guide member extending through said apertures and disposed substantially rigidly at the underside of the cylinder adjacent the windshield glass whereby said cylinder is held against turning, a spacing sleeve on said guide member between said projecting parts, a wiper carriage on said spacing sleeve, a wiper carried by said wiper carriage, and a spring having a portion bearing on said cylinder and a portion bearing on said wiper carriage for resiliently holding said wiper against the windshield glass.

5. In a windshield cleaner, a fluid pressure operated cylinder adapted to reciprocate adjacent a windshield glass, a housing for said cylinder, said housing having a slot therein, parts on the ends of said cylinder projecting into the slot of said housing and having apertures therein, a guide member in said housing arranged over the slot therein and extending through said apertures, said guide member secured in the ends of said housing substantially rigidly adjacent the windshield glass, a spacing member supported by said projecting parts for movement inside the housing and along the slot thereof, and a wiper carriage on said spacing member and projecting through the slot in said housing, whereby said cylinder is held against turning by said guide member.

6. In an automatic windshield cleaner, a cylinder, a piston, fluid supply and exhaust tubes extending in opposite directions from said piston and through the ends of said cylinder, supports for the outer ends of said tubes, end closure members for the cylinder, and projecting parts on said end closure members extending beyond the periphery of said cylinder, a substantially rigid guide member mounted on said supports and guidingly engaged by the projecting parts of said end closure members whereby said cylinder is prevented from turning on said tubes, a sustaining spacer between said projecting parts, a wiper carried by said spacer and adapted to be held against the windshield glass by said guide member, and valves for intermittently admitting operating fluid to the ends of said cylinder, whereby said cylinder is reciprocated on said tubes and said wiper is moved back and forth across the windshield glass.

7. In a windshield cleaner, a reciprocable cylinder, a stationary cooperating piston, fluid supply and exhaust tubes fixed to and extending in opposite directions from said piston through the ends of the cylinder for guiding the cylinder in its reciprocatory movement, spaced supports through which the remote ends of said tubes project, means on the projecting remote ends of said tubes for holding the latter against displacement from said supports, a guide extending in parallelism with said tubes and supported at its ends by said supports, a wiper supporting member arranged laterally of and connected to said cylinder, said guide member and said wiper supporting member being cooperatively related for guiding and steadying the cylinder against lateral vibration, and a wiper on said wiper supporting member held in such position by said guide member as to wipe over the glass of the windshield to which said wiper is attached.

8. In a windshield cleaner, a cylinder mounted for reciprocation, a sleeve supported thereby at the side thereof and in substantial parallellism thereto, a wiper carrier pivotal about the sleeve and supported thereby, a wiper carried by said carrrier, a spring coiled about the sleeve and having one end bearing on said cylinder and its opposite end bearing on said carrier to urge said wiper against the glass of an adjacent windshield, and a guide member cooperating with said sleeve and holding said cylinder against turning.

9. In a windshield cleaner, a piston, fluid supply and exhaust tubes extending in opposite directions from said piston, supports for the remote ends of said tubes, a cylinder enclosing the piston and mounted to reciprocate relative thereto along the tubes and between said supports, a guide member secured at its opposite ends to said supports and extending alongside of the cylinder, terminal arms extending laterally from the opposite ends of the cylinder and engaging the guide member to guide the cylinder in its movements, and a wiper supported by said arms.

10. A windshield cleaner comprising a housing open at its under side, a guide member supported by said housing at its open under side, a wiper carrier slidably supported by said guide member for movement in the open under side of said housing, a piston arranged within said housing above the guide member, fluid supply and exhaust tubes extending in opposite directions from said piston and having their remote ends supported in the ends of said housing, a cylinder enclosing the piston and slidable along the tubes within the housing and above the guide member lengthwise of the latter, a sustaining connection operably connecting the cylinder to said carrier, and a wiper supported by said carrier and depending from the housing.

11. An automatic windshield cleaner comprising a cylinder, a piston therein, fluid supply and exhaust tubes extending in opposite directions from said piston and through the ends of said cylinder for slidably supporting the latter, a housing enclosing the cylinder and having the remote ends of said tubes supported in the end portions of said housing, the under side of said housing being provided with a longitudinal slot, a guide member supported by the housing above the slot and lengthwise thereof, a wiper member mounted for pivotal movement about the guide member within the housing and depending from the housing through its slot, and an operative connection between the cylinder and said wiper member.

12. In a windshield cleaner, a motor having a reciprocable part adapted to reciprocate adjacent the glass of a windshield, a housing for the motor and its reciprocable part, said housing having a slot coextensive with the path of travel of said reciprocable part, a guide supported by and within the housing adjacent its slot for holding said reciprocable part in its operative path of travel, a wiper, a wiper carrier pivotally supported within the housing by said reciprocable part for movement therewith, said carrier extending freely through the housing slot whereby the carrier is permitted to swing with its supported wiper away from the windshield glass, and resilient means for urging the wiper against the windshield glass.

HENRY HUEBER.